United States Patent [19]
York et al.

[11] Patent Number: 5,102,259
[45] Date of Patent: * Apr. 7, 1992

[54] SUB-SURFACE IRRIGATION SYSTEMS

[76] Inventors: Richard D. York; Dianne F. York, both of 8062 Aster Ave., Yucca Valley, Calif. 92284

[*] Notice: The portion of the term of this patent subsequent to Jun. 18, 2008 has been disclaimed.

[21] Appl. No.: 686,231

[22] Filed: Apr. 15, 1991

Related U.S. Application Data

[63] Continuation-in-part of Ser. No. 506,086, Apr. 9, 1990, Pat. No. 5,024,555.

[51] Int. Cl.⁵ ............................................. E02B 13/00
[52] U.S. Cl. ........................................ 405/48; 405/41; 405/44; 405/46
[58] Field of Search ................... 405/36, 39, 40, 41, 405/43, 44, 46, 48; 239/542

[56] References Cited

U.S. PATENT DOCUMENTS

| | | | |
|---|---|---|---|
| 862,276 | 8/1907 | Newman | 405/41 |
| 3,292,378 | 12/1966 | Rosenthal | 405/48 |
| 3,302,408 | 2/1967 | Schmid | 405/44 |
| 3,333,422 | 8/1967 | Neyland | 405/48 |
| 3,426,544 | 2/1969 | Curtis | 405/44 |
| 3,442,087 | 5/1969 | Riusech | 405/39 |
| 3,518,831 | 7/1970 | Tibbals, Jr. | 405/37 |
| 3,966,233 | 6/1976 | Diggs | 405/48 |
| 4,086,774 | 5/1978 | Duggins | 405/39 |
| 4,153,380 | 5/1979 | Hartman | 405/39 |
| 4,193,711 | 3/1980 | Riusech | 405/39 |
| 4,402,631 | 9/1983 | Rosenthal | 405/48 |
| 4,577,997 | 3/1986 | Lehto | 405/43 |
| 5,024,555 | 6/1991 | York | 405/48 |

Primary Examiner—David H. Corbin
Attorney, Agent, or Firm—Richard L. Gausewitz

[57] ABSTRACT

A sub-surface irrigation system includes a conduit connected to a water supply. A plurality of fluid dispenser units are connected to a conduit or conduits. Each of the fluid dispenser units includes a connector interconnected at one end to the interior of the conduit. The other end of the connector is coupled to a drip emitter positioned in an elongated casing. The elongated casing has an enlarged opening at one end and a reduced opening formed at the other end. Tubing interconnects the other end of the connector to the casing. The drip emitter is positioned in the tubing adjacent the casing reduced opening end. In a different invention, the casing extends up to the surface of the ground, so that inspection may be made relative to the operativeness of the drip emitter.

19 Claims, 2 Drawing Sheets

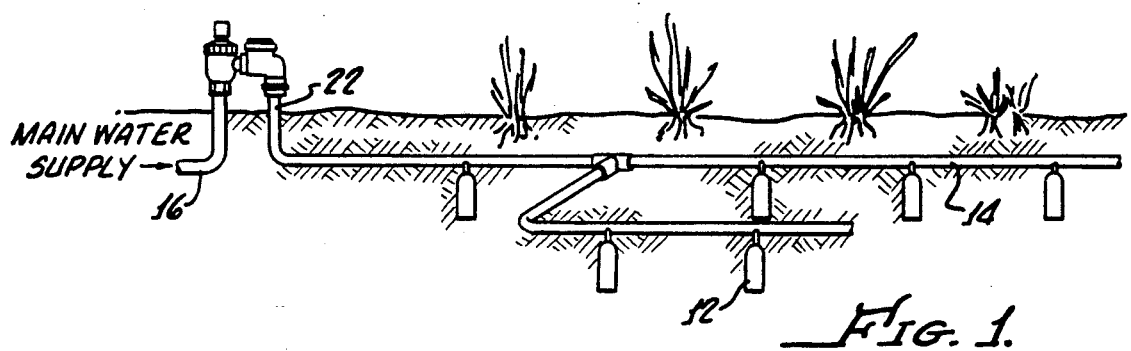
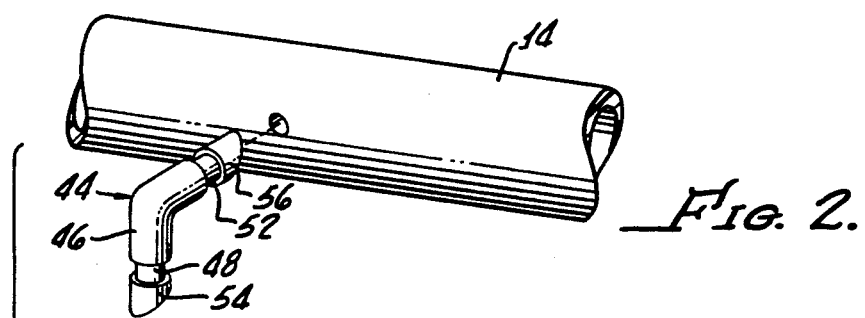
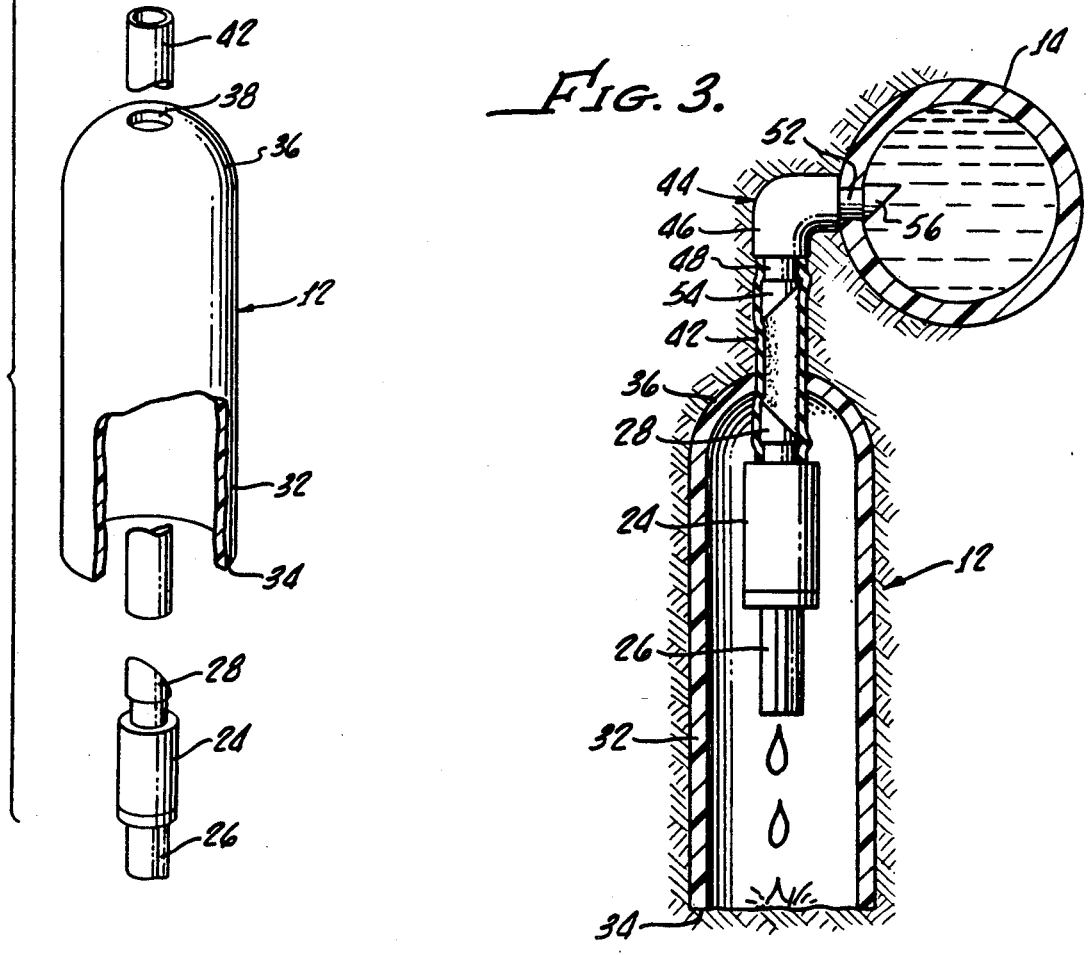

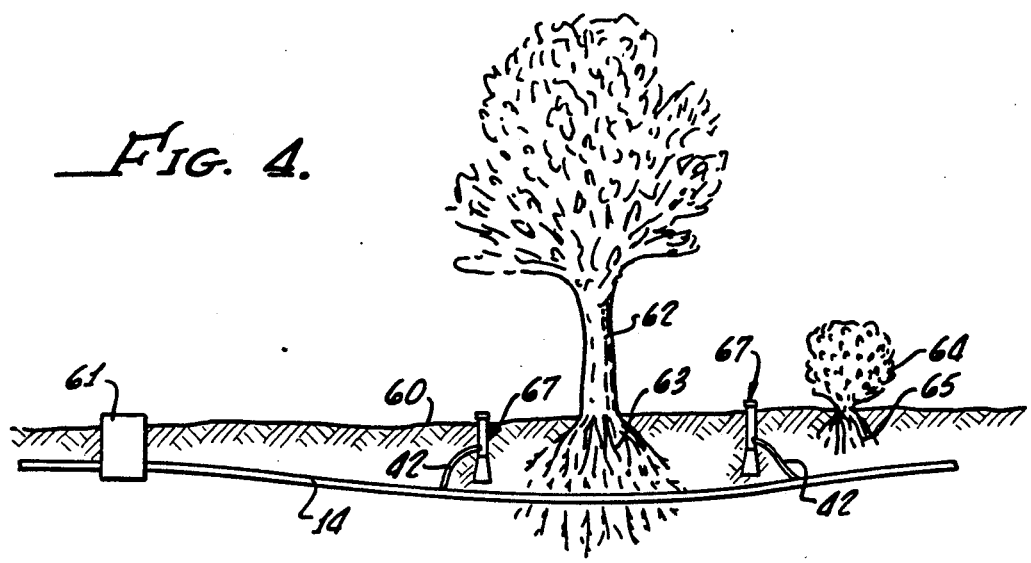
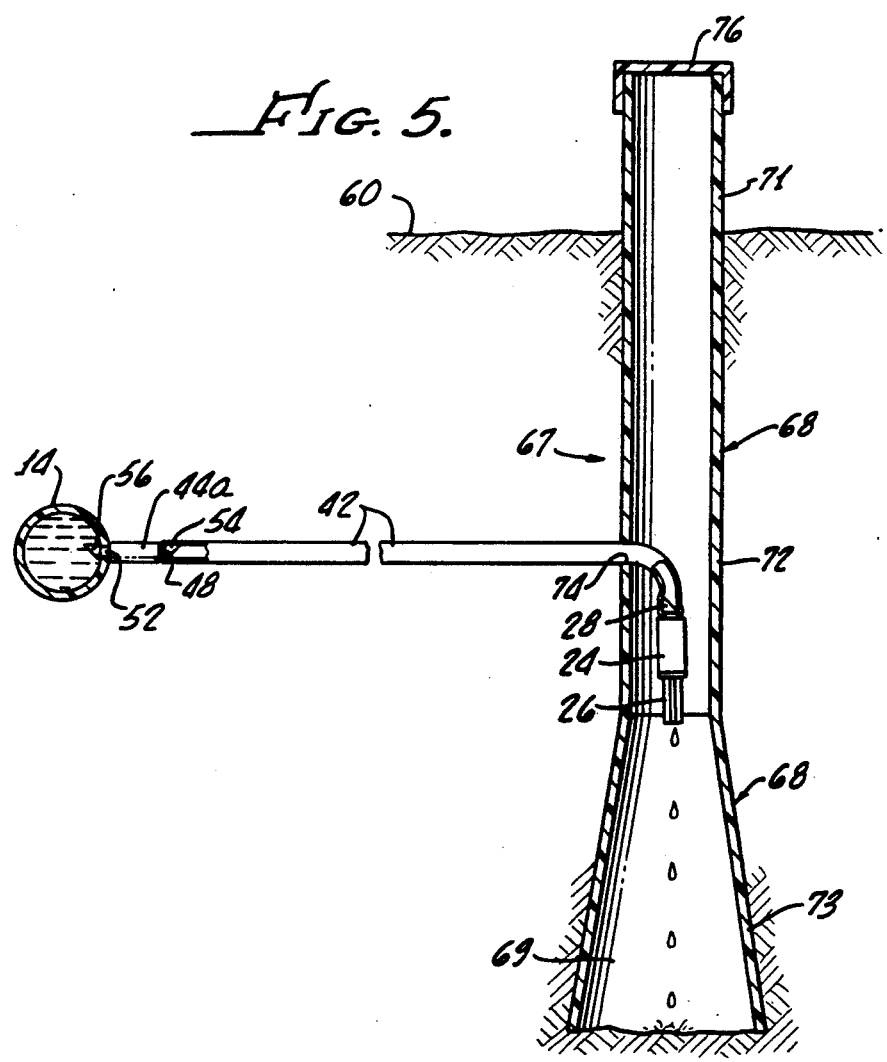

SUB-SURFACE IRRIGATION SYSTEMS

CROSS REFERENCE TO RELATED APPLICATION

This is a continuation-in-part of co-pending patent application Ser. No. 07/506,086, filed Apr. 9, 1990, for Sub-Surface Irrigation System, now U.S. Pat. No. 5,024,555.

BACKGROUND OF THE INVENTION

1. Field of the Invention

The field of art to which the inventions pertain includes the field of sub-surface irrigation systems, and more particularly, to an irrigation system which can be readily secured to a standard conduit mounted or positioned in the ground.

2. Description of Prior Art

Conventional sub-surface irrigation systems modify a conventional conduit through which water flows. For example, in U.S. Pat. No. 4,402,631, nozzles are spaced along a conduit, and flaps integrally formed with the conduit are used to cover the outlet water nozzles. Thus, when the conduit is buried, the flaps can be used to protect the nozzles and prevent the nozzles from being clogged with earth Water will flow freely and not be obstructed by the flaps. However, such an arrangement requires modification of the conduit itself.

Other similar arrangements are shown in U.S. Pat. No. 3,966,233 which utilizes a swatch wrapped around the conduit to shield the nozzle against the entry of dirt as well as to spread water over a slightly greater area than what would be covered if the swatch were not wrapped around the nozzle.

Other known prior art includes U.S. Pat. Nos. 3,302,408; 3,426,544; 3,333,422; 3,518,831; 3,292,378; 3,442,087; and 4,577,997.

The no-clog constructions described herein utilize a drip emitter which can be easily coupled to a conventional conduit. Should the drip emitter or the connecter coupling the drip emitter to the conduit fail, these items can be easily replaced.

In the construction of FIGS. 1-3 of the present application, it is not known whether any particular drip emitter is working properly, unless the ground becomes wet all the way up to the surface of the earth. Furthermore, it is frequently desirable that insufficient water be employed to wet the ground all the way up to the surface. In some soils the ground may be wet up to the surface, while in others it may not.

SUMMARY OF THE INVENTIONS

In accordance with a first invention, there are a sub-surface irrigation system having a conduit connected to a water supply, and a plurality of fluid dispenser units connected to the conduit. Each of the dispenser units comprises a connecter interconnected at one end of the interior of the conduit, the other end of the connector being coupled to a drip emitter positioned in an elongated casing. The elongated casing has an enlarged opening at one end and a reduced opening formed at the other end. Tubing interconnects the other end of the connector to the casing. The drip emitter is positioned in the casing adjacent the reduced opening end thereof.

In accordance with a second invention, there is a casing (formed by wall means) disposed in the earth, extending from a region substantially below the surface to a region substantially flush with or somewhat above the surface of the earth. The upper end of the casing is open or is provided with a cap so as to be openable. When the upper end is open, an operator may look down into the casing and inspect the drip emitter and also inspect the condition of the earth adjacent the drip emitter.

The drip emitter and casing combinations, and method, are employed primarily for trees and shrubs.

The advantages of the inventions, both as to their constructions and methods of operation, will be readily appreciated when the same become better understood with respect to the accompanying drawings in which the like reference numerals indicate like parts throughout the figures.

BRIEF DESCRIPTION OF THE DRAWINGS

FIG. 1 is a perspective view of the sub-surface irrigation system according to the first invention and utilizing the fluid dispenser units of the first invention;

FIG. 2 is an enlarged fragmentary sectional view of a typical arrangement of a conduit supplying water to a fluid dispenser unit;

FIG. 3 is a vertical cross-sectional view taken on FIG. 1;

FIG. 4 is a view of the sub-surface drip irrigation system of the second invention; and FIG. 5 is a vertical cross-sectional view taken on FIG. 4.

DESCRIPTION OF THE FIRST INVENTION

Referring now to the drawings, there is shown in FIG. 1, a sub-surface distribution system for irrigation having fluid dispenser units 12 constructed in accordance with principles of the first invention. The fluid dispenser units 12 are illustrated connected to a conventional conduit 14 buried in the ground. Water from a supply 16 is fed through a valve 18 to an above ground conduit 22 which in turn is connected to the conduit 14. Water in the conduit 14 is dispensed into the ground via the fluid dispensing units 12 which will be described in greater detail hereinafter.

It should be understood that although a single conduit 14 is illustrated, a plurality of conduits could be connected to the water supply 16 and valve 18. In addition, it should be understood that the system could also operate by means of an automatic valve system in place of the mechanical valve 18 illustrated in FIG. 1.

Referring now to FIGS. 2 and 3, a fluid dispensing unit 12 is shown in greater detail connected to the conduit 14. The fluid dispensing unit 12 includes a conventional drip emitter 24 having an outlet end 26 and an inlet end 28. As can be seen clearly in FIG. 3, the drip emitter 24 is positioned in a casing 32. The casing 32 is illustrated as being formed of an elongated cylinder having an open end 34 and a closed end 36 which contains a reduced diameter opening 38. Tubing 42 extends through the casing reduced diameter opening 38 and forms a tight seal therewith.

The drip emitter inlet end 28 extends into the tubing 42 positioned within the casing 32. As shown in FIG. 3, a drip emitter 24 is mounted so that its outlet end 26 is substantially recessed from the casing open end 34.

A ninety degree connector 44 interconnects the main line conduit 14 to the tubing 42. The connector 44 comprises an L-shaped elbow 46 having reduced diameter necks 48 and 52 extending from each end thereof, respectively. The reduced diameter necks 48 and 52 extending from each end thereof, respectively. The reduced diameter necks 48 and 52 in turn are each connected to enlarged angled free end piercing heads 54 and 56, respectively.

The connector 44 is connected to the main line conduit 14 by puncturing a hole therein and inserting the free end head 56 therein until the neck 52 is adjacent the conduit wall surface as can be seen in FIG. 3. This arrangement normally forms a water tight seal between the connector 44 and the main line conduit 14. The other end head 54 is inserted into the tubing extending through the exterior of the casing 32.

In normal assembly, the tubing 42 is inserted through the casing opening 38 until the free end thereof extends below the casing open end 34. The drip emitter inlet end 28 is then inserted into the tubing 42 free end. The tubing 42 is then pulled back through the casing 32 until the drip emitter inlet end is adjacent the casing opening 38 as shown in FIG. 3. The tubing 42 is then cut so that a sufficient length is available to attached the connector neck 48 and free end head 54 therein as shown in FIG. 3. Then the connector 44 is attached to the conduit as shown in FIG. 3.

Normally drip irrigation systems are used in time intervals i.e. once or twice per day, and the moisture will have a chance to drain completely from the casing 32 after each interval. Thus, roots or other growth are not likely to grow into the casing. Further, the casing acts as a protector so that the drip emitter cannot become clogged. Unlike other prior art systems, the first invention requires no modification of the main line conduit 14 as the connector 44 is attached directly to the conduit.

While a 90 degree connector 44 has been illustrated, it should be understood that the 90 degree elbow is not necessary as a straight or other angled connector could be used for connection to the side of the conduit 14 or on the bottom of the conduit.

It should be understood that the drip emitter 24 is for illustrative purposes only and that other types of drip emitters could be used.

The first invention eliminates certain of the problems of above ground systems, that of malicious or unintentional destruction of sprinkler systems by both people and animals.

DETAILED DESCRIPTION OF THE SECOND INVENTION

Referring to FIGS. 4 and 5, there is shown a second invention.

In FIG. 4, the conduit 14 is shown buried beneath the surface 60 of the ground, and is connected to an automatic valve or timer mechanism 61 adapted to effect watering for desired time periods at desired intervals.

A tree 62 having roots 63 is growing in the ground in the general vicinity of conduit 14, the latter having been disposed in that location (This is not to imply that the watering elements of the present invention may not be disposed quite far from conduit 14, because the tubing 42 may be quite long ) There is also shown in FIG. 4 a shrub 64 having roots 65.

Embedded in the ground adjacent tree 62 and shrub 64 are fluid dispenser units 67. Each fluid dispenser unit 67 is connected to conduit 14 through tubing (a tube) 42, for example made of soft polyvinylchloride.

Referring next to FIG. 5, each fluid dispensing unit comprises wall means 68 (a casing) to define a chamber 69 in which is disposed a drip emitter 24. As previously stated, other drip emitters may be employed as well known in the art.

The wall means 68 is made of a suitable synthetic resin. It has a top portion 71 which projects above the surface 60 of the ground. Alternatively, top portion 71 may be flush (substantially) with the surface of the ground so that a lawn mower may be operated thereover. Except as stated below, the end of the top portion is open.

Below top portion 71 is an intermediate portion 72, the latter extending downwardly and being connected to a bottom 73. In the best mode now contemplated by the inventor, top portion 71 and intermediate portion 72 constitute a single hollow cylindrical tube, and bottom portion 73 is a hollow frustum of a cone that is coaxial with tube 71-72. The frustom diverges downwardly, and is open at its bottom end.

The drip emitter 24 is connected to conduit 14 by the tubing 42 which is extended through a side portion of wall means 68. Thus, a hole 74 is provided in intermediate portion 72 and is somewhat undersize in comparison to the outer diameter of tubing 42. Thus, when the tubing 42 is pulled through hole 74 there is an effective seal against ingress of dirt. Tubing 42 is connected to drip emitter 24 as previously described, and extends through the earth, being buried therein, to a connector 44a that is identical to the one described relative to the previous invention, being of that type (preferably) that is straight instead of elbow shaped. As previously stated, the connector may be straight, elbow shaped, angular, etc.

In the best mode now contemplated by the inventor, hole 74 is about four inches below the surface 60. Also, preferably, upper portion 71 extends about two inches above the surface, provided the location is such that there is no grass to be mowed. The entire wall means 68 (comprising portions 71-73, inclusive) is, for example, one foot long. Bottom portion 73 is four inches long, and portions 71,72 are in combination eight inches long. The diameter of portions 71,72 is one and one-quarter inch, and the largest diameter of portion 73 is two and one-half inches. These dimensions are given by way of example only, not limitation.

A cap 76 is provided over the upper end of portion 71, in the preferred embodiment. This minimizes evaporation and prevents ingress of unwanted objects into the chamber 69.

In installing the fluid dispensing units 67, tubing 42 is threaded inwardly through hole 74 from the outside, and then is grasped and pulled to or out the open bottom of frustoconical portion 73. The drip emitter 24 is then connected to the tubing, following which the tubing is pulled back through the hole 74 until the drip emitter is quite close to such hole.

Then, the fluid dispensing unit 67, and others exactly like it, are buried in the earth—except at the upper portions 71—near the tree 62, shrub 64, etc. The relationships are caused to be such that water from each unit 67 will reach the tree roots 63 and/or shrub roots 65 at least when water has been fed to the units 67 for a substantial period of time, for example one-half hour.

The timer 61 is set to deliver water to units 67 for periods of (for example) two hours, followed by a time spacing of sufficient length to adapt the system for the particular degree of water in the earth, for the particular type of tree or shrub, etc., and for the particular type of soil.

The relationships are caused to be such that chamber 69 has a certain amount of water therein after a substantial period of water flow has occurred, for example one-half hour. This varies with soil conditions and soil water. The water in chamber 69 passes into the earth through the open bottom of the bottom portion 73. The time interval between waterings is caused to be such that each chamber 69 drains completely of water after each watering.

The cone 73 increases the surface area contacted by the water and thus the rate of water flow into the earth from chamber 69. Furthermore, the cone prevents the fluid dispensing unit 67 from being pulled out of the earth by a vandal, acting as a ground anchor for the unit.

The rate of water flow is, at least in the vast majority of cases, sufficiently slow that water does not come out the upper end of element 71.

When the operator of the system wishes to check to determine whether or not everything is operating properly, he or she removes the cover 76 and looks down through elements 71–72. It can thus be readily be seen whether or not there is water in chamber 69. If the operator sees that chamber 69 is dry when timer 61 is in "water-flow" condition, repairs are made so as to correct the condition.

The foregoing detailed description is to be clearly understood as given by way of illustration and example only, the spirit and scope of this invention being limited solely by the appended claims.

What is claimed is:

1. A combination including a sub-surface water-distribution system, said combination comprising:
   (a) a plant planted in the earth,
   (b) a drip emitter,
   (c) wall means to define a chamber adapted to receive said drip emitter,
     said drip emitter being disposed at least substantially in said chamber in such manner as to feed water into said chamber,
     said wall means having relatively large-area water-outlet opening means therein through which water from said drip emitter may pass and soak into the earth,
     said wall means being at least largely buried in the earth in the vicinity of said plant,
       said water-outlet opening means being sufficiently close to said plant that water passing through said water outlet opening means into the earth will reach roots of said plant,
   (d) a water supply conduit, and
   (e) tubing connected at one end to the interior of said conduit and at the other end to said drip emitter for conducting of water to said drip emitter and thence through said chamber and water-outlet opening means to the earth and to said roots.

2. The invention as claimed in claim 1, in which said plant is a tree.

3. The invention as claimed in claim 1, in which said plant is a shrub.

4. The invention as claimed in claim 1, in which all of said wall means is buried in the earth.

5. The invention as claimed in claim 1, in which said tubing is flexible and is passed through a hole in said wall means in substantially sealing manner for prevention of substantial passage of dirt into said chamber, and in which said tubing and hole are so sized that said tubing may be pulled to different positions relative to said wall means, for connecting said drip emitter to said tubing and for positioning said drip emitter in said chamber.

6. The invention as claimed in claim 1, in which said tubing is buried in the earth.

7. The invention as claimed in claim 1, in which said wall means and chamber are elongate, in which said water-outlet opening means is in one end of said wall means, and in which said drip emitter is entirely in said chamber, and in which said tubing enters said chamber through a hole in said wall means, said hole being located at an intermediate portion of said wall means.

8. A combination including a sub-surface water-distribution system, said combination comprising:
   (a) a plant implanted in the earth,
   (b) a drip emitter,
   (c) wall means to define a chamber adapted to receive said drip emitter,
     said drip emitter being disposed at least substantially in said chamber in such manner as to feed water into said chamber,
     said wall means having relatively large-area water-outlet opening means therein through which water from said drip emitter may pass and soak into the earth,
     said wall means being at least largely buried in the earth in the vicinity of said plant,
       said water-outlet opening means being sufficiently close to said plant that water passing through said water outlet opening means into the earth will reach roots of said plant,
     a portion of said wall means being substantially at or above the surface of the earth,
   (d) second opening means provided in said above-surface portion of said wall means, through which a person may check the interior of said chamber so as to see whether or not said drip emitter is feeding water to the earth,
   (e) a water supply conduit, and
   (f) tubing connected at one end to the interior of said conduit and at the other end to said drip emitter for conducting of water to said drip emitter and thence through said chamber and water-outlet opening means to the earth and to said roots.

9. A drip-irrigation apparatus for trees, shrubs, and other plants, which comprises:
   (a) an elongate wall means defining a chamber,
     said chamber being adapted to have a drip emitter disposed therein,
     said wall means having openings at both ends thereof,
       one of said openings being adapted to be below the surface of the earth and to discharge water from said chamber,
       the other of said openings being adapted to be at or above the surface of the earth and to permit inspection of the interior of said chamber, and
   (b) a drip emitter disposed in said chamber and adapted to receive water from a supply conduit.

10. A drip-irrigation apparatus for trees, shrubs, and other plants, which comprises:
   (a) an elongate wall means defining a chamber,
     said chamber being adapted to have a drip emitter disposed therein,
     said wall means having openings at both ends thereof,
       one of said openings being adapted to be below the surface of the earth and to discharge water from said chamber, the other of said openings being adapted to be at or above the surface of the earth and to permit inspection of the interior of said chamber, (b) a drip emitter disposed in said chamber and adapted to receive water from a supply conduit, and (c) ground anchor means to prevent lifting of said wall means out of the earth.

11. The invention as claimed in claim 10, in which said ground anchor means is a divergent portion of said wall means adjacent said one opening, said divergent portion diverging away from said other opening.

12. A drip-irrigation apparatus for trees, shrubs, and other plants, which comprises:

(a) an elongate wall means defining a chamber,
said chamber being adapted to have a drip emitter disposed therein,
said wall means having openings at both ends thereof,
one of said openings being adapted to be below the surface of the earth and to discharge water from said chamber, the other of said openings being adapted to be at or above the surface of the earth and to permit inspection of the interior of said chamber, (b) a drip emitter disposed in said chamber and adapted to receive water from a supply conduit, and (c) removable cap means to cover said other opening.

13. A drip-irrigation apparatus for trees, shrubs, and other plants, which comprises:

(a) an elongate wall means defining a chamber,
said chamber being adapted to have a drip emitter disposed therein,
said wall means having openings at both ends thereof,
one of said openings being adapted to be below the surface of the earth and to discharge water from said chamber, the other of said openings being adapted to be at or above the surface of the earth and to permit inspection of the interior of said chamber,
said wall means being an elongate synthetic resin hollow cylinder,
said cylinder connecting coaxially to a synthetic resin hollow frustocone,
the wide end of said frustocone being remote from said cylinder,
said wide end being open and forming said one opening,
the end of said cylinder remote from said frustocone being open and forming said other opening, and (b) a drip emitter disposed in said chamber and adapted to receive water from a supply conduit.

14. The invention as claimed in claim 13, in which said frustocone is buried vertically in the earth adjacent a plant, in which the wide end of said frustocone is at the lower end thereof, said wide end being open and forming said one opening, in which the upper end of said cylinder is at or above the surface of the earth, and in which other open end forms said other opening, and in which flexible tubing extends to said drip emitter through a hole in the side of said cylinder.

15. A drip-irrigation apparatus for tress, shrubs, and other plants, which comprises:

(a) an elongate wall means defining a chamber,
said chamber being adapted to have a drip emitter disposed therein,
said wall means having openings at both ends thereof,
one of said openings being adapted to be below the surface of the earth and to discharge water from said chamber, the other of said openings being adapted to be at or above the surface of the earth and to permit inspection of the interior of said chamber,
said wall means being buried in the earth adjacent a plant, but with said other opening above the surface of the earth, (b) a drip emitter disposed in said chamber and adapted to receive water from a supply conduit, and (c) a buried water-supply tube extending through a side of said wall means to said drip emitter.

16. A method of watering a plant, which comprises:

(a) providing wall means to define a chamber adapted to receive a drip emitter,
said wall means having an opening adapted to drain from said chamber water introduced therein from said drip emitter, when said wall means is in a generally vertical orientation, (b) providing a drip emitter in said chamber, (c) burying said wall means in the earth adjacent roots of a plant, in said generally vertical orientation, and also in such manner that said chamber does not become filled with earth, whereby water from said drip emitter will pass through said chamber and said opening to the earth and thus to said plant, and (d) supplying water slowly to said drip emitter.

17. The invention as claimed in claim 16, in which said supplying step is effected periodically for substantial time periods, the water draining from said chamber after each of said time periods.

18. The invention as claimed in claim 16, in which said burying is so performed that all of said wall means is below the surface of the earth.

19. A method of watering a plant, which comprises:

(a) providing wall means to define a chamber adapted to receive a drip emitter,
said wall means having an opening adapted to drain from said chamber water introduced therein from said drip emitter, when said wall means is in a predetermined orientation, (b) providing a drip emitter in said chamber, (c) burying said wall means in the earth adjacent roots of a plant, in said predetermined orientation, whereby water from said drip emitter will pass through said chamber and said opening to the earth and thus to said plant,
said burying being so performed that part of said wall means is at or above the surface of the earth, (d) said method further comprises providing a view opening in said part of said wall means, (e) visually inspecting said chamber and drip emitter through said view opening, and (f) supplying water to said drip emitter.

* * * * *